United States Patent [19]

Flaschar et al.

[11] 4,089,344
[45] May 16, 1978

[54] TWO-WAY PRESSURE-CONTROL VALVE

[75] Inventors: Heinz Flaschar, Asperg; Heinz Kleinschmidt, Ditzingen; Peter Kroll, Gemmrigheim; Günter Fischer, Freiberg, all of Germany

[73] Assignee: Robert Bosch GmbH, Stuttgart, Germany

[21] Appl. No.: 781,458

[22] Filed: Mar. 25, 1977

[30] Foreign Application Priority Data

Apr. 13, 1976 Germany .............................. 2616251

[51] Int. Cl.² .............................................. F16K 17/18
[52] U.S. Cl. ..................................... 137/491; 137/493
[58] Field of Search ......................... 137/489, 491, 493

[56] References Cited

U.S. PATENT DOCUMENTS 3,090,398 5/1963 Adams .............................. 137/493 X Primary Examiner—Robert G. Nilson
Attorney, Agent, or Firm—Michael J. Striker

[57] ABSTRACT

A two-way pressure-control valve has a housing formed with an axially extending bore adjacent whose front end opens a front port and adjacent whose rear end opens a rear port. A valve body is slidable in the bore between the rear port and the front end and a piston is slidable in the bore between the rear end and the rear port. Thus the valve body can slide across the front port and block fluid flow between the ports via the bore, and the valve body and the piston define a front compartment, a middle compartment always connected to the rear port and connectable to the front port when the valve body is moved forwardly, and a rear compartment. A passage is formed in the housing for connecting the front port to the rear compartment so that the pressure in the middle and rear ports is always effective across the piston. In addition the valve body is formed with an axially through-going small-diameter orifice that allows pressurization of the front compartment to the same pressure as the middle compartment. The front compartment is connected to the front port via a pilot valve that opens when a predetermined pressure differential is exceeded. Finally a spring biases the valve body rearwardly into a position blocking the front port. Such a valve opens whenever the pressure in either of the ports exceeds the pressure in the other port by a predetermined pressure differential.

10 Claims, 1 Drawing Figure

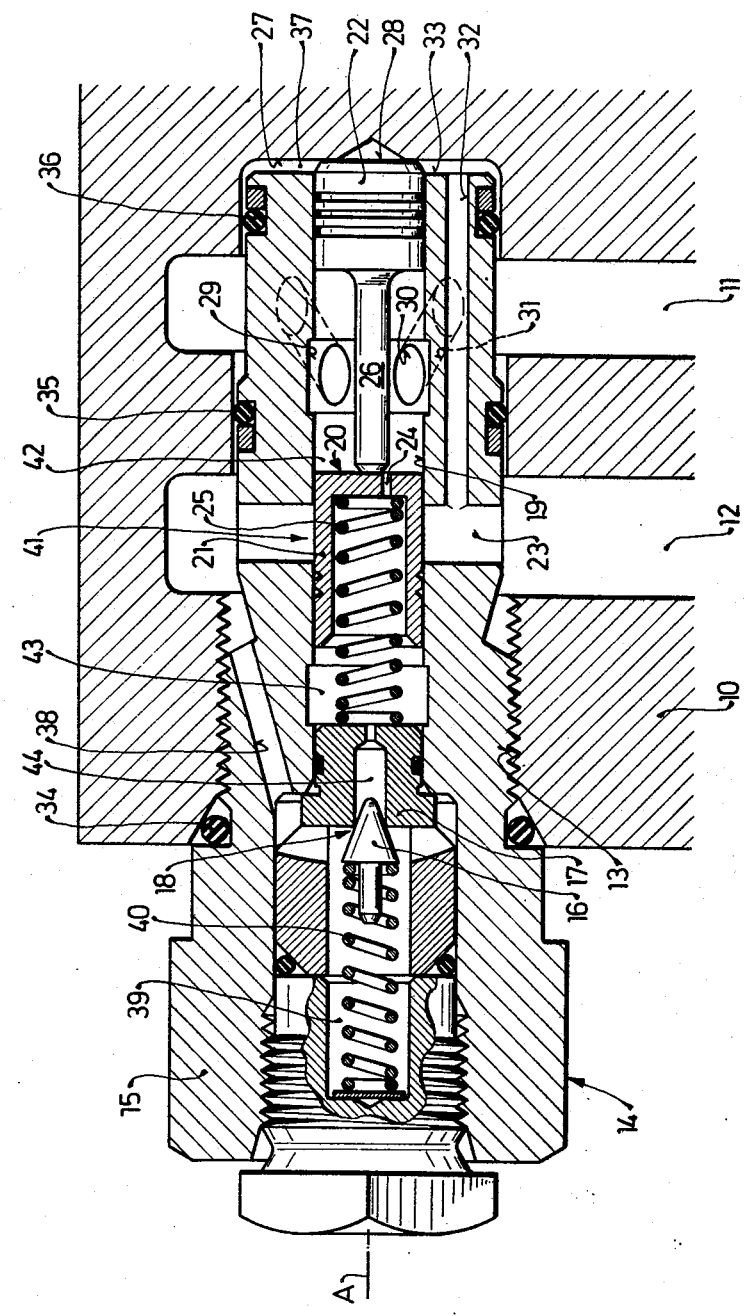

TWO-WAY PRESSURE-CONTROL VALVE

BACKGROUND OF THE INVENTION

The present invention relates to a pressure-control valve. More particularly this invention concerns a two-way pressure limiting valve.

It is frequently necessary, in a shock absorber or the like, to limit the pressure differential existing between two lines. A two-way pressure-control valve is employed which connects the two lines together whenever the pressure in either of the lines exceeds the pressure in the other line by a predetermined differential.

Such a valve is known whose housing is formed with an axis-defining bore into which open two axially spaced ports each of which is connected to a respective one of the above-mentioned lines. Slidable in one position against the force of a biasing spring from a predetermined central rest position is a sleeve. A valve body is slidable in the opposite direction from a central rest position against the force of a spring also. In the central rest positions the valve body and the sleeve lie snugly against each other and prevent flow between the ports. When the one line is pressurized to a predetermined extent more than the other line the sleeve will be pushed away from the valve body and, therefore, the ports will be connected. When the other port is pressurized to a predetermined extent more than the one port the valve body is pushed away from the sleeve and, once again, the two ports are interconnected.

Such a valve is relatively expensive to manufacture and complicated in use. In addition the effective surface areas of the two members, namely the valve body and the seat-forming sleeve, are different so that the pressure differential for response in one direction is different from the pressure differential in the other direction. What is more the use of a valve body and sleeve of this type often allows considerable leakage through the system when it is not responding to a pressure differential.

SUMMARY OF THE INVENTION

It is therefore an object of the present invention to provide an improved two-way pressure-control valve.

Another object is to provide such a valve which can be easily set to respond at substantially the same pressure differential in both directions.

Yet another object is to provide such a valve which is relatively simple in construction and sure in operation.

These objects are attained according to the present invention in a two-way pressure-control valve whose housing is formed with an axially extending bore having a front end and a rear end and with respective axially spaced front and rear ports opening into the bore. A valve body is provided in the bore between the rear port and the front end and is axially displaceable in the bore between a closed position covering the front port and preventing fluid flow between the ports via the bore and an open position uncovering the front port and permitting such fluid flow. A spring braced between the housing and the valve body normally urges the valve body toward the rear end. A piston is axially slidable in the bore between the rear port and the rear end of the bore and is engageable axially with the valve body. Thus the valve body defines in the bore with the front end thereof a front compartment and with the piston a middle compartment, whereas the piston forms with the rear end a rear compartment in the bore. A fluid-flow restriction is provided between the rear port and the front compartment for limited fluid flow therebetween. In addition a pilot valve is connected between the front compartment and the front port and opens up the front compartment into the front port when the pressure in the front compartment exceeds the pressure in the front port by a predetermined pressure differential. Finally a passage connects the front port with the rear compartment so that the piston can be displaced into engagement with the valve body to displace this valve body into the open position when the pressure at the front port exceeds the pressure at the rear port by a predetermined pressure differential.

Thus in accordance with the present invention the middle compartment is continuously under the same pressure as the rear port and the rear compartment is continuously under the same pressure as the front port. The piston therefore is pressurized on one side with the pressure at the front port and on its opposite side with the pressure at the rear port. The front compartment ahead of the valve body is normally under the same pressure as the rear compartment so that this slide-type valve body has a force acting in one direction on it which is created by the pressure in the rear port solely and in the other direction has this same pressure effective on it along with the force of the biasing spring. Thus the valve body will normally be moved toward the rear end and will block the front port.

Once, however, the pilot valve between the front compartment and the front port responds, since the pressure in the middle compartment which is fed through the restriction into the front compartment now considerably exceeds that in the front port, the pilot valve will open and at least partially depressurize the front compartment, allowing the pressure in the middle compartment to push this valve body forwardly into the open position and thereby interconnect the two ports.

On the other hand if the pressure in the front compartment exceeds that in the rear compartment by a predetermined limit the piston will act differentially and physically push the slider or valve body forwardly so as to uncover the front port and connect the front and rear ports together.

It is therefore possible with the present invention to set the valve so that it responds to the exact same pressure differential in both directions, that is whenever either of the ports is pressurized more than the other port by more than a predetermined limit the valve will open, and will again close as soon as this predetermined limit is undershot. The structure of the present invention also allows this valve to be used in heavy-duty applications with a relatively great flow. What is more the system can be made to respond to very small pressure differentials if desired so that the load pressure and the working pressure, in particular in shock-absorber use, can be very close to each other.

According to further features of this invention the piston is provided with a forwardly and axially extending projection that is axially engageable with the rear face of the slider or valve body. This projection also defines the rearward rest position of the valve body in the closed position thereof.

According to yet another feature of this invention the restriction is constituted by a small-diameter hole passing axially through the valve body. To this end the valve body is generally cylindrical and cup-shaped, open axially forwardly and receiving in its hollow interior the biasing spring. The pilot valve is mounted in the forward end of the bore and is, in accordance with this invention, also constituted a check valve so that fluid flow is only possible in one direction through the pilot valve.

In accordance with yet another feature of this invention the housing is actually constituted of several parts, including a tubular or sleeve insert formed with the bore. The bore is of cylindrical shape so that the front and rear faces of both the valve body and the piston are of the same effective surface area. This tubular insert is fitted into the outer housing part and is formed with radially opening holes that extend from the respective front and rear ports to the cylindrical bore. In addition the passage connecting the front port of the rear chamber is formed in this sleeve and extends axially adjacent the bore. Seals in the form of O-rings are provided between the sleeve and a hole in the housing outer part to relatively seal the two members.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The sole FIGURE of the drawing is an axial section through a valve according to the present invention.

DESCRIPTION OF A PREFERRED EMBODIMENT

As shown in the drawing a valve according to the present invention has an outer housing part 10 formed with two parallel chambers or ports 11 and 12 intended for connection respectively to a load and a return. The housing part 10 is formed with a stepped bore 13 in which is fitted a valve unit 14 having a stepped tubular housing 15 threaded into this bore 13.

The tube 15 is formed with a bore 19 of cylindrical shape defining an axis A. At the front end of this bore there is provided a seat member 17 which cooperates with a valve body 16 having a biasing spring 40 to form a pilot valve 18. In addition a slide-type main valve 41 is provided in the bore 19. The front port 12 opens via four angularly equispaced and radially throughgoing holes or apertures 23 into the bore 19 and the rear port 11 opens via four radially equispaced bores 31 having inner ends or mouths 30 at an inwardly open circumferential groove 29 formed in the bore 19. This groove 29 is axially ahead of the rear port 11 so that the holes or passages 31 are inclined forwardly from the outside toward the inside. In addition the sleeve 15 is formed between one of the holes 23 and its rear face 33 with an axial passage 32. The bores 31 and 23 are angularly offset relative to each other so that the passage 32 does not intersect one of the bores 31.

The valve 41 is constituted as a cylindrical and cup-shaped valve body 21 displaceable from the closed position shown in the drawing wherein it overlies and blocks the holes 23 to a position to the left of this position wherein it uncovers the passages 23 and therefore connects the ports 11 and 12 together via the bore 19 and the passages 23 and 31. The valve body 21 has a rear face 20 turned in one axial direction and a front face constituted by several different surfaces, but of the same effective surface area as the face 20. A compression spring 25 bears on the front end of the bore 19 as defined by the element 17 and a portion of the front face of the valve body 20. In addition this valve body 20 is formed with a small-diameter bore or passage 24 that is axially throughgoing and which therefore acts as a fluid-flow restriction between the middle compartment 42 formed in back of the body 21 and the front compartment 43 formed in front of the body 21.

A piston 22 is axially displaceable in the bore 19 in back of the body 41. This piston 22 has a rear face 28 engageable with a surface 27 of the bore 13 which in reality constitutes the rear end of the bore 19. The forwardly facing surface 27 of the housing part 10 and the rearwardly facing surfaces 33 and 28 of the sleeve 15 and piston 22 respectively form a rear compartment 37. In addition the piston 22 is provided on its front end with a forwardly and axially extending stem or projection 26 engageable with the rear face 20 of the valve body 21. The effective surface areas of the front face of the piston 22 exposed in the compartment 42 and the rear face 28 are identical.

The pilot valve 18 has a side 44 which opens into the front compartment 43 and a side 39 which opens via a passage 38 into the front port 12 of the housing part 10.

The sleeve 15 is sealed at the extreme front end of the housing part 10 by means of an O-ring 34. Another O-ring 35 is provided between ports 11 and 12, and a third O-ring 36 is provided between the compartment 37 and rear port 11.

The valve described above functions as follows:

Under normal circumstances the pressure in ports 11 and 12 or the lines connected thereto will be substantially the same. Thus the pressure in chambers 42 and 43 will be substantially the same and the pressure differential between the sides 39 and 44 of the pilot valve 18 will not be great enough to push the pilot-valve body 16 away from the seat 17. Thus the valve body 21 will be pushed by the spring 25 to the right-hand end position shown in the drawing abutting the stem 26 and the piston 22 will have its face 28 abutting the surface 27.

When the pressure in the port 11 rises beyond a predetermined pressure differential above the pressure in the port 12 the front compartment 43 will become pressurized through the restriction 24 to an extent sufficient to open the valve 18 whose side 39 is connected to the low-pressure front port 12. As soon as this valve 18 opens the compartment 43 is quickly depressurized. Since the restriction 24 only allows limited fluid flow between the middle compartment 42 and the front compartment 43, a pressure differential will be created across the valve body 21. As long as this pressure differential is stronger than the biasing force of the spring 25 the body 21 will move forwardly, toward the left, and uncover the holes or ports 23 so that the ports 11 and 12 will be interconnected. The valve body 21 will remain in this position until the pressure differential between the ports 11 and 12, and therefore between the compartments 42 and 39, falls below the set level. Thereupon the valve body 21 will move again to the right and block the holes 23. At the same time the chamber 43 will rise to the same pressure as the chamber 42 and the sides 39 and 44 of the pilot valve 18 will not have enough of a pressure differential across them to open this valve 18. It is noted that during such operation, with the pressure in line 11 greater than in line 12 the pressure effective on the front face of the piston 22 will be greater than that on the rear face of the piston 22 so that this element will not move at all in the bore 19.

When, on the contrary, the pressure in line 12 exceeds the pressure in line 11 beyond a predetermined limit the pressure in chamber 37, derived from the port 12 via the passages 23 and 32, will be considerably greater than the pressure in chamber 42 effective on the opposite face of the piston 22. This pressure differential directly effective across the piston 22 will therefore displace the piston 22 forwardly, that is to the left, so as to push the valve body 21 from the illustrated closed position into the open position by means of the stem 26. This action plainly connects the ports 11 and 12 together. Such interconnection will continue until the pressure differential is less than the predetermined limit. It is noted that the threshold differential in this direction is established almost solely by the spring 25.

Thus in accordance with the present invention pressure control in both directions is possible with a heavy-duty slide-valve mechanism. Thus relatively large fluid flows can be accommodated by the valve in accordance to this invention. In addition the main valve body has opposite effective surfaces areas which are substantially the same as those of the pistons, this 1:1 relationship allows the shock absorber pressure and the working pressure to lie very close to each other.

It will be understood that each of the elements described above, or two or more together, may also find a useful application in other types of mechanisms differing from the types described above.

While the invention has been illustrated and described as embodied in a two-way pressure-control valve, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A two-way pressure-control valve comprising:
   a housing formed with an axially extending bore having a front end and a rear end and with respective axially spaced front and rear ports opening into said bore;
   a valve body in said bore between said rear port and said front end and axially displaceable in said bore between a closed position covering said front port and preventing fluid flow between said ports via said bore and an open position uncovering said front port and permitting such fluid flow;
   a spring braced between said housing and said valve body normally urging same toward said rear end;
   a piston axially displaceable in said bore between said rear port and said rear end and engageable axially with said valve body, said valve body defining in said bore with said front end a front compartment and with said piston a middle compartment, said piston forming with said rear end a rear compartment;
   means including a fluid-flow restriction between said rear port and said front compartment for limited fluid flow therebetween;
   means including a pilot valve between said front compartment and said front port for opening up said front compartment into said front port when the pressure in said front compartment exceeds the pressure in said front port by a predetermined pressure differential; and
   means including a passage connecting said front port with said rear compartment for displacing said piston into engagement with said valve body and displacing same into said open position when the pressure at said front port exceeds the pressure at said rear port by a predetermined pressure differential.

2. The valve defined in claim 1, wherein said piston has a forwardly and axially projecting stem axially engageable with said valve body.

3. The valve defined in claim 1, wherein said piston and said valve body are independently axially displaceable.

4. The valve defined in claim 1, wherein said bore is substantially cylindrical, said valve body having a front face exposed in said front compartment and a rear face exposed in said middle compartment, said piston having a front face exposed in said middle compartment and a rear face exposed in said rear compartment, said faces all being of substantially the same effective surface area.

5. The valve defined in claim 4, wherein said housing includes a housing outer part formed with a large diameter recess and an inner sleeve fitted in said recess and forming said bore, said sleeve being formed with radially throughgoing apertures aligned with said ports, said sleeve being formed with said passage.

6. The valve defined in claim 5; further comprising annular seals between said ports and between said sleeve and said housing outer part.

7. The valve defined in claim 1, wherein said valve body is formed with an axially throughgoing small-diameter hole constituting said restriction.

8. The valve defined in claim 1, wherein said pilot valve includes a valve seat, a pilot-valve body sealingly engageable with said seat, and a spring urging said pilot-valve body into engagement with said seat.

9. The valve defined in claim 8, wherein said spring of said pilot valve is on the side thereof connected to said front port, whereby said pilot valve constitutes a check valve preventing fluid flow from said front port through said pilot valve into said front compartment.

10. The valve defined in claim 1, wherein said valve body is formed with a small-diameter axially throughgoing passage constituting said restriction, said valve body abutting axially in said closed position on said piston, said piston having a front face exposed in said middle compartment and a rear face of substantially the same effective surface area exposed in said rear compartment.

* * * * *